United States Patent
Cevacins et al.

(10) Patent No.: US 11,964,761 B1
(45) Date of Patent: Apr. 23, 2024

(54) UNMANNED AERIAL VEHICLES WITH DUCTED FANS

(71) Applicant: Alarm.com Incorporated, Tysons, VA (US)

(72) Inventors: Olegs Cevacins, Jurmaia (LV); Philip Carter, New Denver (CA)

(73) Assignee: Alarm.com Incorporated, Tysons, VA (US)

(*) Notice: Subject to any disclaimer, the term of this patent is extended or adjusted under 35 U.S.C. 154(b) by 204 days.

(21) Appl. No.: 16/847,581

(22) Filed: Apr. 13, 2020

Related U.S. Application Data (60) Provisional application No. 62/832,643, filed on Apr. 11, 2019.

(51) Int. Cl.
*B64C 39/02* (2023.01)
*B64U 10/13* (2023.01)
(Continued)

(52) U.S. Cl.
CPC ............ *B64C 39/024* (2013.01); *B64U 10/13* (2023.01); *B64U 30/20* (2023.01); *B64U 50/14* (2023.01);
(Continued)

(58) Field of Classification Search
None
See application file for complete search history.

(56) References Cited

U.S. PATENT DOCUMENTS

| | | | | |
|---|---|---|---|---|
| 5,035,377 A | * | 7/1991 | Buchelt | B64C 11/001 416/223 R |
| 7,470,108 B2 | * | 12/2008 | Watanabe | F04D 29/545 415/222 |

(Continued)

FOREIGN PATENT DOCUMENTS

| | | | | |
|---|---|---|---|---|
| CN | 207510709 U | * | 6/2018 | |
| CN | 108945419 A | * | 12/2018 | B60P 3/11 |

(Continued)

OTHER PUBLICATIONS

Hambling, David, "Aussie Hovering Drone is Straight Outta <cite>Avatar</cite>," Wired, Dec. 17, 2009, [accessed on Apr. 9, 2020], retrieved from: URL<https://www.wired.com/2009/12/australian-drone-perches-stares/> 3 pages.

(Continued)

*Primary Examiner* — Jelani A Smith
*Assistant Examiner* — Jacob Daniel Underbakke
(74) *Attorney, Agent, or Firm* — Fish & Richardson P.C.

(57) ABSTRACT

Methods, systems, and apparatus, including computer programs encoded on a computer storage medium, are described for implementing an unmanned aerial vehicle or drone with ducted fans. The drone includes a housing having a first surface and multiple ducts that each extend from the first surface to a second surface of the housing. The first surface is substantially flat. A respective fan assembly is installed in each of the ducts. The drone includes an internal cavity at a location intermediate two respective ducts and (Continued)

circuitry positioned in the internal cavity. The circuitry is operable to generate control signals used to operate the respective fan assemblies.

15 Claims, 4 Drawing Sheets

(51) Int. Cl.
*B64U 30/20* (2023.01)
*B64U 50/14* (2023.01)
*B64U 50/19* (2023.01)
*B64U 101/30* (2023.01)

(52) U.S. Cl.
CPC .......... *B64U 50/19* (2023.01); *B64U 2101/30* (2023.01); *B64U 2201/10* (2023.01)

(56) References Cited

U.S. PATENT DOCUMENTS

| | | | | |
|---|---|---|---|---|
| 9,710,709 | B1* | 7/2017 | Beard | G06K 9/6201 |
| 2006/0214052 | A1* | 9/2006 | Schlunke | B64C 39/064 |
| | | | | 244/73 C |
| 2009/0138140 | A1* | 5/2009 | Pinney | B64D 47/08 |
| | | | | 356/3 |
| 2009/0304504 | A1* | 12/2009 | Ishiba | F02K 3/068 |
| | | | | 415/211.2 |
| 2010/0140416 | A1* | 6/2010 | Ohanian, III | B64C 21/04 |
| | | | | 244/23 A |
| 2014/0237819 | A1* | 8/2014 | Brownell | B23P 15/006 |
| | | | | 29/889.6 |
| 2017/0102699 | A1* | 4/2017 | Anderson | G06V 20/13 |
| 2017/0159674 | A1* | 6/2017 | Maciolek | B64C 11/001 |
| 2017/0187082 | A1* | 6/2017 | Zhao | B64C 39/024 |
| 2018/0128387 | A1* | 5/2018 | Strongin | F16K 15/03 |
| 2018/0257775 | A1* | 9/2018 | Baek | B64C 27/20 |
| 2018/0338422 | A1* | 11/2018 | Brubaker | H04N 1/00129 |
| 2019/0042865 | A1* | 2/2019 | Vallespi-Gonzalez | G06T 7/521 |

FOREIGN PATENT DOCUMENTS

| | | | | |
|---|---|---|---|---|
| KR | 20160129750 A | * | 11/2016 | |
| WO | WO-2008031174 A1 | * | 3/2008 | B64C 27/20 |
| WO | WO-2018000696 A1 | * | 1/2018 | B64D 47/08 |
| WO | WO-2018165313 A1 | * | 9/2018 | B64C 23/06 |

OTHER PUBLICATIONS

[No Author Listed], "Jerkybot Product Webpage," Shendrones, (undated) [accessed on Apr. 9, 2020], retrieved from: URL<http://www.shendrones.com/jerkybot>, 10 pages.

[No Author Listed], "Liberty Ducted Quad," Shendrones, (undated) [accessed on Apr. 9, 2020], retrieved from: URL<http://www.shendrones.com/liberty-ducted-quad>, 9 pages.

* cited by examiner

UNMANNED AERIAL VEHICLES WITH DUCTED FANS

CROSS-REFERENCE TO RELATED APPLICATION

This application claims the benefit of U.S. Application No. 62/832,643, filed Apr. 11, 2019, which is incorporated by reference in its entirety.

TECHNICAL FIELD

This specification generally relates to unmanned aerial devices.

BACKGROUND

Unmanned aerial vehicles can be configured as monitoring devices or sensors and are often dispersed at various locations at a property, such as a home or commercial business. These sensors and aerial devices can have distinct functions at different locations of the property. Some unmanned aerial vehicles (UAVs) at a property are autonomous vehicles or drones that offer different types of monitoring and control functionality. The functionality afforded by these drones can be leveraged to secure items at a property, to obtain information about respective items at multiple different properties, and to visually monitor conditions of items located at the properties. The usefulness and functionality of the drones may be dependent on their size, imaging ability, and related controls. In some cases, autonomous vehicles such as drones and UAVs may require small or light-weight designs that are beneficial for accomplishing objectives related to legislative initiatives, human and property safety considerations, or minimizing visual and acoustic footprints.

SUMMARY

One aspect of the subject matter described in this specification can be embodied in a drone for surveilling a property or monitoring conditions at the property. The drone includes a housing that includes: a first surface, wherein the first surface is substantially flat; and multiple ducts that each extend from the first surface to a second surface of the housing; a respective fan assembly installed in each of the multiple ducts; an internal cavity at a location intermediate two respective ducts of the multiple ducts; and circuitry positioned in the internal cavity. The circuitry is operable to generate control signals used to operate the respective fan assemblies.

One aspect of the subject matter described in this specification can be embodied in a method for monitoring conditions at a property using a drone. The method includes providing control signals generated using circuitry positioned in an internal cavity of a drone, and, based on the control signals, operating each fan of a respective fan assembly installed in each duct of the multiple ducts included at the drone. The method includes generating a first air pressure at a first surface of the drone in response to operating each fan wherein the first air pressure is distributed over an entire surface area of the first surface based on the first surface being substantially flat; and generating a second air pressure at a second surface of the drone in response to operating each fan, wherein the second air pressure is higher than the first air pressure based on the first surface being substantially flat.

One aspect of the subject matter described in this specification can be embodied in a method of manufacturing a drone. The method includes: providing a housing with a first surface, a second surface, and a sidewall between the first and second surface; forming multiple ducts at the housing, each duct corresponding to a respective hole that extends from the first surface to the second surface; installing, in each of the multiple ducts, a respective fan assembly; forming an internal cavity at a location intermediate two respective ducts; connecting circuitry positioned in the internal cavity to the fan assembly, wherein the circuitry is operable to generate controls signals for operating the fan assembly; and causing the first surface to be substantially flat such that a first, low air pressure is generated at the first surface and a second, high air pressure is generated at the second surface when each respective fan assembly is operated.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for the design and manufacture of improved unmanned, autonomous aerial vehicles ("drones") that include multiple ducted fans. This specification also describes property monitoring systems for commercial or residential properties that can use the drones to monitor items or conditions at the property.

Drones that include ducted fans are configured to have improved aerodynamic attributes that allow the drones to achieve improved performance relative to drones that do not include ducted fans. The improved performance can be realized with reference to longer flight times relative to similarly-sized drones without ducted fans, such as drones that include open fans. Drones with ducted fans may have improved performance when compared to similarly-sized drones without ducted fans for various reasons. For example, each of the ducted fans that can be included in the improved drone described in this document is configured to reduce tip losses relative to an open fan.

The drones include a flat or substantially flat surface top surface and the ducted fans are used in conjunction with the substantially flat surface top surface to create an area of low air pressure at an inlets of the ducts that include the fans. The low air pressure migrates over the top surface of the drone to augment lift generated from an area of high pressure at a bottom surface of the drone. In some implementations, the area of low air pressure migrates or is generated over an entire top surface of the drone to enhance a hovering efficiency of the drone relative to similarly-sized drone that does not include at least a substantially flat top surface and/or multiple ducted fans. The enhanced hovering efficiency may be beyond that attainable with independent ducted fans or open rotors of similar total disk area.

Additionally, during operations in urban environments, around people, and/or around valuable property, moving parts (such as motors and propellers) of a drone's propulsion or flight control system may be enclosed based on the ducted fan design. The control system's components may be required to be partially or fully enclosed or covered for a variety of reasons such as safety, efficiency, etc. For example, in some environments, it may be beneficial to cover rotating propellers to protect people from injuries associated with uncovered fans. Ducting the propeller/fan blades may help to cover the moving parts and protect people from the blades in case of a collision. Accordingly, aspects of the present disclosure may improve safety and efficiency of propulsion systems for ultra-light and ultra-small drones.

The property monitoring system may include sensors, such as motion or imaging sensors, at a property to monitor conditions at the property. In addition to the sensors, drones can be positioned at the property to monitor conditions at the property. The monitoring system includes a control unit and controls that enable automation of actions at the property. Security/property monitoring systems can include several sensors, drones, and other devices that perform specific functions at a property. These drones and devices interact with the control units, or directly with a monitoring server, to provide sensor data to the monitoring server and to receive commands from the monitoring server.

Figure 1:
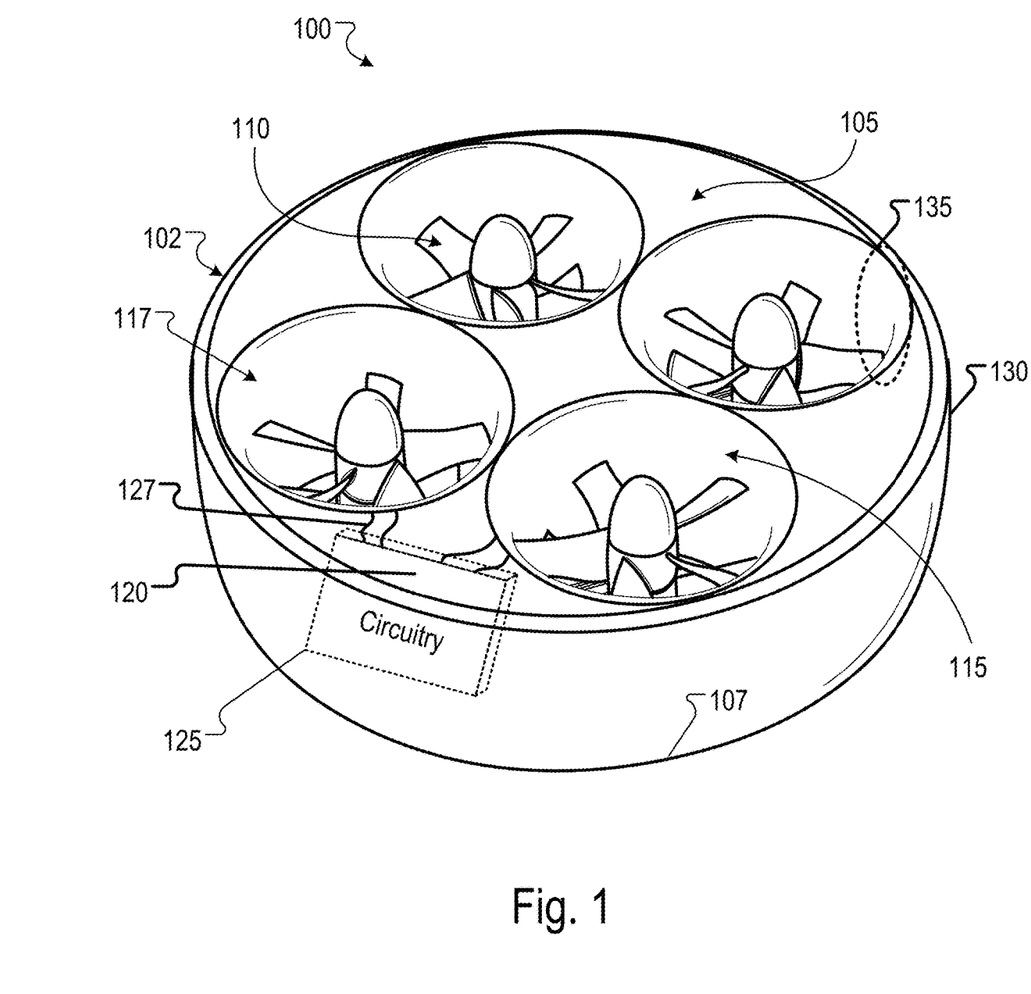
FIG. 1. shows an example of an unmanned aerial vehicle with ducted fans.

FIG. 1. shows an example of an unmanned aerial vehicle or drone 100 with ducted fans. In the example of FIG. 1 the drone 100 includes a housing 102 that represents a body or frame of the drone 100. The housing 102 includes a first/top surface 105 and a second/bottom surface 107. The top surface 105 may be parallel to the ground, for example, when the drone 100 is positioned on the ground in area of the ground that is substantially flat.

A respective fan assembly 110 of the drone 100 is installed in each duct 115 at the drone 100. For example, the housing 102 can include multiple ducts 115 that each extend from the top surface 105 to the bottom surface 107 of the housing. In some implementations, the drone body (or housing 102) defines two or more ducts that extend through the drone body and the flat top surface 105. The ducts 115 may be configured to curve inward along a particular section of its inner wall.

The top surface 105 is substantially flat. In some implementations, the top surface 105 is flat or completely flat. For example, the top surface 105 can be an even, level plane that includes a continuous horizontal surface that does not include peaks or depressions. In some cases, the top surface 105 is an even surface, a horizontally level surface, or a substantially even surface having minimal or no inflections.

In some implementations, the bottom surface 107 is flat or substantially flat, whereas in some other implementations the bottom surface 107 is not flat or substantially flat and may include one or more inflections or depressions.

The drone includes an internal cavity 120 at a location intermediate two respective ducts 115. In some implementations, the drone 100 includes multiple internal cavities at various internal locations of the housing 102. The drone 100 includes circuitry 125 positioned in the internal cavity 120. In some implementations, the circuitry 125 includes various circuit boards, components, and/or devices that may be placed at different internal locations of the drone 100, including multiple different internal cavities 120.

The circuitry 125 is operable to generate control signals used to operate the respective fan assemblies 110. The drone 100 includes one or more electrical connections 127. The electrical connections 127 can be used to exchange signal communications between the circuitry 125 and each fan assembly 110, including other components of the drone 100. The electrical connections 127 can also be used to exchange signal communications between different components of the drone 100.

The drone includes multiple air inlets 117. For example, the drone 100 includes an inlet 117 for each of the ducts 115. In some implementations, each of the air inlets 117 is merged to the flat, or substantially flat, top surface 105. The merged air inlets 117 for each of the ducts 115 contributes to reducing a static pressure of air that is drawn into the inlet at the top surface 105. The drone 100 is configured to utilize lowered static pressure near the inlets 117 of the ducts 115. In some implementations, the lowered static pressure is lower relative to a static pressure (e.g., a higher static pressure) at the bottom surface 107. The lowered static pressure causes the drone 100 to gain additional lift during operation of the fan assemblies. For example, the drone 100 uses the lowered static pressure to gain additional lift relative to the lift provided by the static pressure at the bottom surface 107.

The inlet 117 of each of the ducts 115 includes a rounded edge between an inner wall of the duct 115 and the flat top surface 105. The housing 102, or drone 100, includes a sidewall 130 between the top surface 105 and the bottom surface 107. A respective vertical section 135 of each of the ducts 115 is adjacent to and/or parallel to a corresponding section of the sidewall 130. The drone 100 includes multiple regions at the top surface 105 of the housing 102.

The regions may be triangular regions or may appear to be triangular in shape. Each region, or triangular region, corresponds to a circular dimension of the drone 100 and is defined by a portion of an outer diameter of two respective ducts 115. In some implementations, one or more of the triangular regions define spacing between the ducts 115. At least one region corresponds to a wall that defines an internal cavity 120. In some other implementations, components or circuits that form the internal circuitry 125 are distributed evenly by weight within the internal cavities 120 that correspond to the outer triangular regions. In some implementations, the components as well as a power source of the drone 100 are distributed within the housing 102 to achieve a balanced weight distribution at the drone 100.

Although not shown in at FIG. 1, the drone 110 may be a device or component of an example computing system. The computing system 300 may correspond to an example property monitoring system that includes one or more control units and a monitoring server. In some implementations, data obtained using sensing or imaging devices of the drone 110 may be processed locally at the drone 110, remotely at the monitoring server, or both. This is described in more detail below with reference to the example of FIG. 3.

Figure 2:
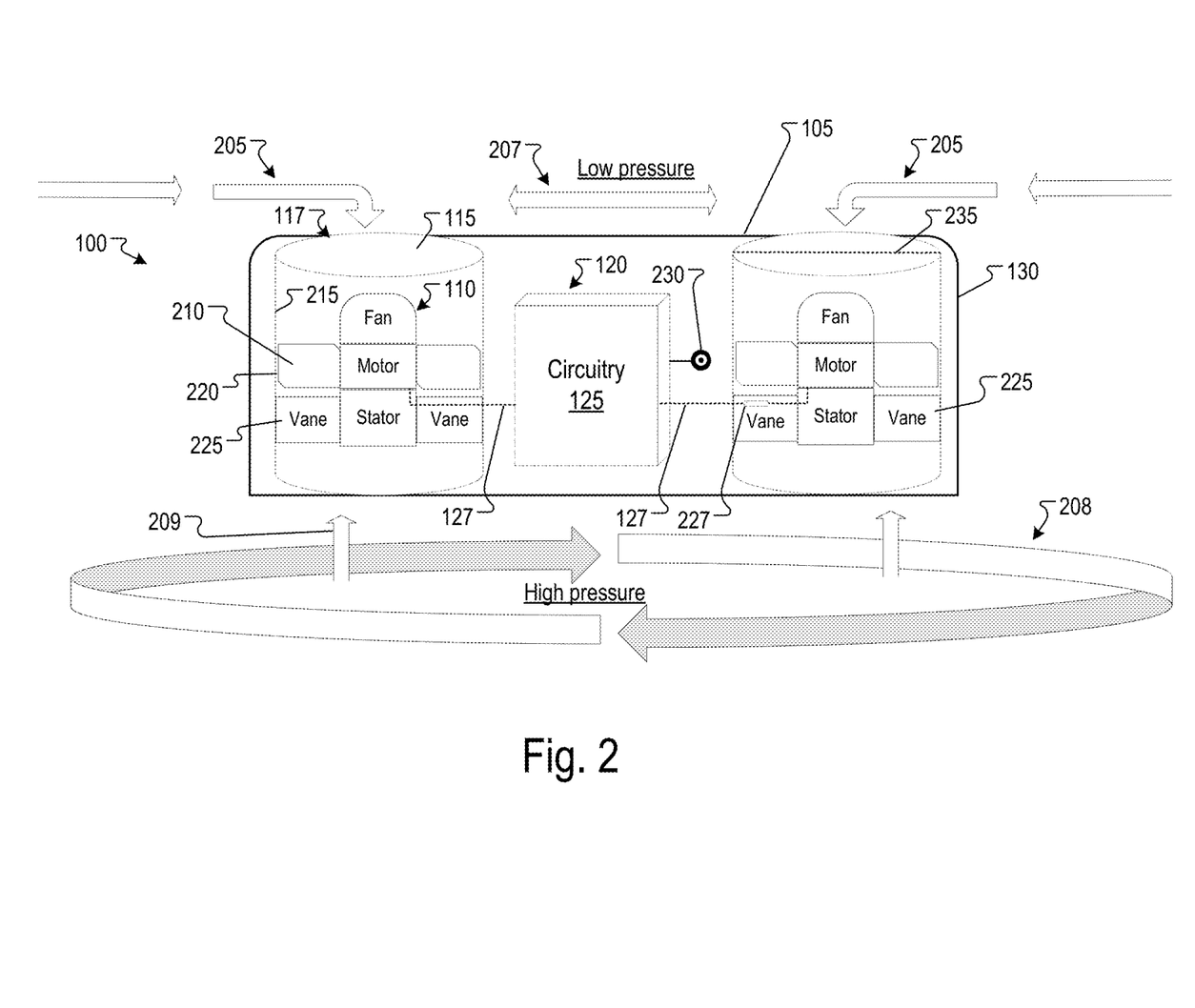
FIG. 2 shows an example cross-section of an unmanned aerial vehicle with ducted fans.

FIG. 2 shows an example cross-section of an unmanned aerial vehicle with ducted fans. In the example of FIG. 1 a drone including four is shown, however the drone 100 may include more, or fewer, than four ducted fans. The fan assemblies 110 are referred to alternatively as ducted fans 110.

As shown in the example of FIG. 2, the ducted fans 110 include a fan blade 210 (or propeller 210) positioned inside a duct 115. The drone 100 also includes a flat or substantially flat top surface 105, as described above. In some implementations, the top of each of the ducts 115 is substantially level with the flat top surface 105 of the drone 100. In some implementations, the top of the ducts 115 may be merged with the flat top surface 105 of the drone 100. In some implementations, the ducts 115 may include a rounded portion between a substantially vertical walls 215 of the duct 115 and the substantially horizontal flat top surface 105 of the drone 100.

Operating each respective fan assembly 110 increases air pressure at the bottom surface 107 of the housing 102, which results in a lift for flying the drone 100. The air pressure at the surface 105 also augments the lift for flying the drone 100. Each fan assembly 110 includes a fan blade 210 or propeller positioned within each of the ducts 115 and configured to rotate or operate to draw air 205 and generate air pressure 207, 208 that provides lift to the drone 100. As the fan assemblies 110 draw air 205 through the air inlets 117 from above the drone 110, the fan assemblies 110 create or generate an area of low pressure 207 above the fan assemblies 110. In some implementations, the low pressure area may extend above the flat surface 105 of the drone 110. As described above, the low pressure 207 above the flat surface 105 of the drone provides additional lift to the drone 110. The low pressure augments lift provided by pressure 207 and enhances hovering efficiency of the drone 100.

Each respective fan assembly 210 includes a respective motor that is coupled to receive control signals from the circuitry 125 to generate air pressure 207 at the top surface 105 and the air pressure 208 at the bottom surface 107 in response to operating the respective fan assemblies 110. In some implementations, the air pressure 207 is present over an entire surface area of the top surface 105 based on the top surface 105 being flat or substantially flat.

The air pressure 207 is less than the air pressure 208 based on the first surface being substantially flat. In some implementations, flat surface 105 at the top of the drone 100 cooperates with the ducted fans 110 to create/generate a force vector 209 that is substantially vertical. In some implementations, the force vector 209 provides the additional lift. The force vector 209 can be in line with the force generated by the blades 210. The force vector 209 may be associated with the pressure 208.

The drone 100 includes a respective fan for each respective fan assembly 110 and each respective fan includes the multiple fan blades 210 described above. The drone 100 includes a gap 220 that represents a distance between a tip of each of the multiple fan blades 210 and an inner wall 215 of the duct 115 that includes the fan blades 210. The distance represented by the gap 220 is not larger than 0.5% of a diameter 235 of a corresponding duct 115. In general, each fan assemblies 110 includes a fan, a motor, and a stator vane. For each duct 115, the respective motor in each respective fan assembly 110 is positioned in line with the respective fan of the fan assembly and the multiple blades 210 of the respective fan assembly.

The drone 100 includes a respective stator vane 225 in each of the ducts 115. In some implementations, the respective stator vane 225 is secured in a corresponding duct 115 by way of attachment to the inner wall 215 of the corresponding duct. One or more of the respective stator vanes 225 are configured to receive electrical connections 127 for routing signals between the circuitry 125 and the respective motor one or more of the fan assemblies 210. In some implementations, the control signals used to operate the respective fan of each respective fan assembly 110 are provided using the electrical connections 127 between the circuitry 125 and a respective motor. These electrical connections can be routed using internal passages 227 in one or more of the stator vanes 225. In some implementations, the electrical connections correspond to three-phase wires for brushless DC motors.

The drone 100 includes an sensing/imaging device 230. The device 230 may be integrated at the sidewall 130 or at the bottom surface 107. In some implementations, the device 230 is used to obtain images of objects external to the drone 100, such as during hoovering or general operation of the drone 100. The circuitry 125 can include one or more processors and a non-transitory machine-readable storage device storing instructions that are executable by the one or more processors to cause performance of operations. The operations can include obtaining, using the device 230, image data associated with the objects. The operations can also include using the processors to process the image data to detect the objects and, in response to processing the image data, controlling the drone based on the detected objects.

Figure 3:
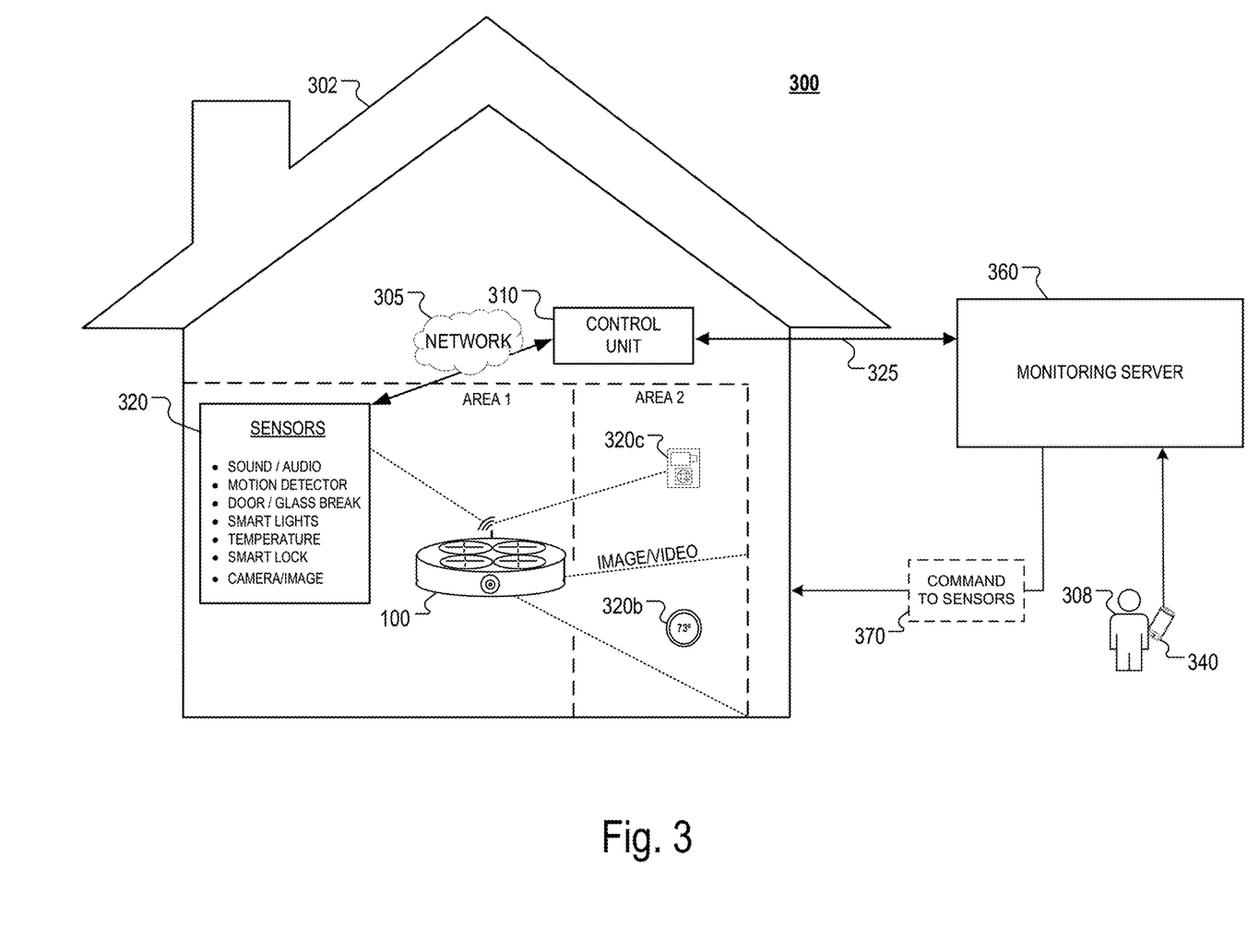
FIG. 3 shows a block diagram of an example property and property monitoring system that includes drones for monitoring conditions at the property.

FIG. 3 shows a block diagram of an example property and property monitoring system ("system 300") that includes drones for monitoring conditions at the property. The property 302 may be, for example, a residence, such as a single family home, a townhouse, a condominium, or an apartment. In some examples, the property 302 may be a commercial property, a place of business, or a public property, such as a police station, fire department, or military installation. The property 302 may correspond to the property 302 described above.

The system 300 can include multiple sensors 320. Each sensor 320 can be associated with various types of devices that are located at property 302. For example, a sensor(s) can be associated with contact sensor 320a that is operable to detect when a door or window is opened or closed. In some examples, a sensor can be a temperature control device 320b that is operable to control a temperature setting for an area or room at the property 302. Similarly, a sensor can be associated with a video or image recording device 320c located at the property 302, such as a digital camera or other electronic recording device.

As described above, the property 302 is monitored by a property monitoring system. The property monitoring system includes a control unit 310 that sends sensor data 325, obtained using sensors 320, to a remote monitoring server 360. In some implementations, the control units, monitoring servers, or other computing modules described herein are included as sub-systems of the property monitoring system 300. Each of the sensors 320 can use various types of technology to transmit sensor signal data or to exchange data communications with devices of system 300 (or the property monitoring system). In some implementations, one or more sensors 320 at the property 302 can be at least one of: a Z-Wave enabled sensing device, a Bluetooth enabled sensing device, a Wi-Fi enabled sensing device, or a sensing device that uses radio or wireless signal technology. Additional sensor features are described in more detail below.

The system 300 also includes a drone 100 that is operable to generate image data which may be transmitted as sensor data 325 to the monitoring server 360. The image data can be processed at the monitoring server 360 to monitor and determine conditions at the property or to generate a layout or mapping of items or objects, including sensors 320, at the property 302. For example, a drone 100 can be used to survey the property 302 to determine whether items are secure at the property or to build a multi-dimensional map, such as a two-dimensional (2D) or three-dimensional (3D) model that includes 2D/3D map or physical layout of the property 302. In some implementations, the drone 100 surveys the property 302 and transmits parameters (or parameter values), sensor/drone data, and status information to the monitoring server 360 to determine conditions at the property or to generate the multi-dimensional map/model.

For example, the drone 100 is operable to transmit: (i) parameter signals that characterize a status or attribute of the items/objects, (ii) data that describes communications and interactions between the drone 100 and each of the sensors 320 or items at the property 302, and (iii) imagery data (e.g., "mapping data") about the property 302 to the monitoring server 360 to generate the multi-dimensional model. In some examples, the drone 100 interacts with the monitoring server 360 to determine the conditions concurrent with the drone 100 performing the survey of property 302.

The drone 100 are operable to receive commands 370 and other signals from the monitoring server 360 or from a client device 340 of a user 308. In some implementations, the command 370 is a data payload that includes instructions and data values for commanding the drone 100 to perform one or more specific functions at the property 302. For example, a command 370 can cause the drone 100 to travel to a particular area of the property 302, triggering of a particular sensor 320 at the property 302, or transmitting imagery or mapping data from the drone 100 to the monitoring server 360.

Figure 4:
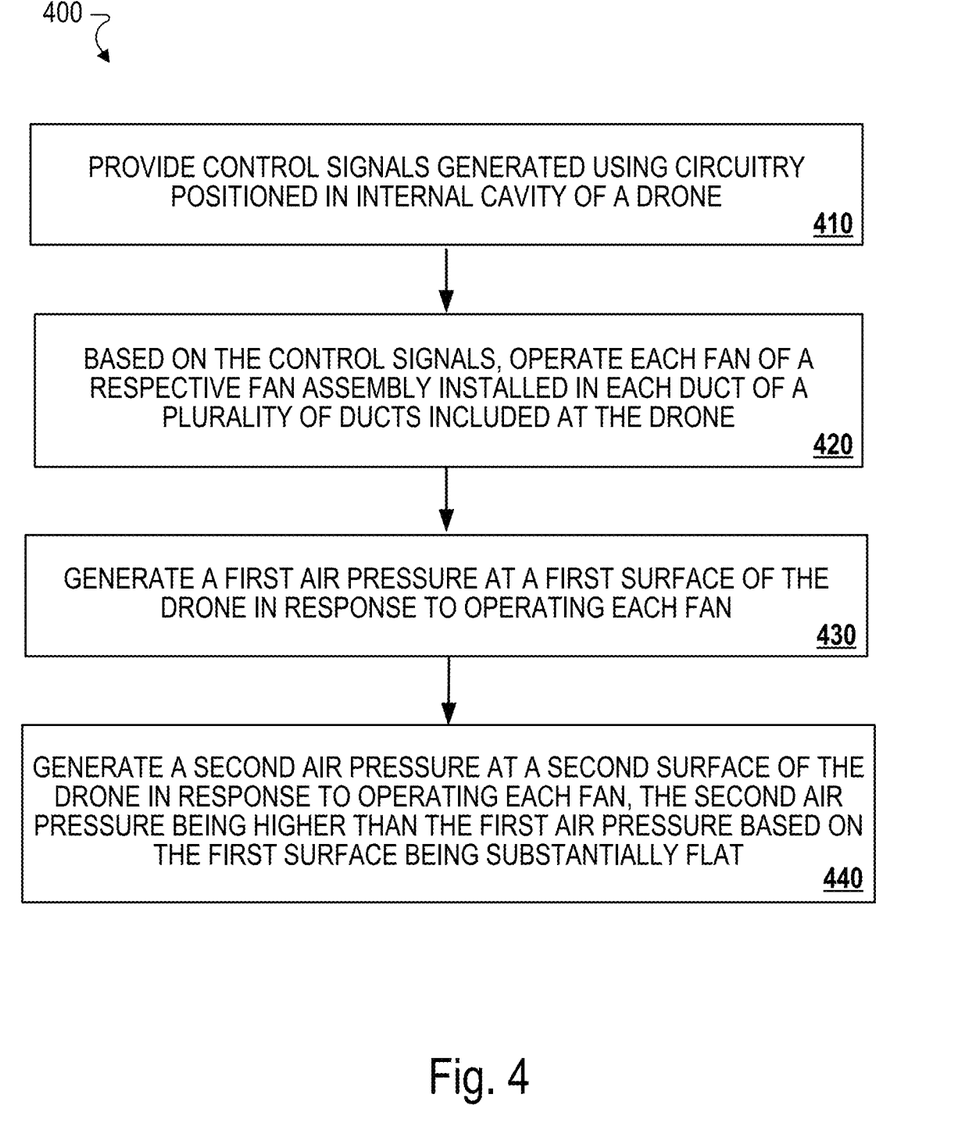
FIG. 4 shows an example process for monitoring a property using a drone.

FIG. 4 shows an example process 400 for monitoring a property using a drone. The drone can correspond to an example drone 100 described above, including a security drone or a security camera drone. Process 400 can be implemented or executed using the system 300, described above. Descriptions of process 400 may reference the above-mentioned computing resources of system 300.

The steps or actions of process 400 may be implemented based on programmed firmware, or software instructions, that are executable by one or more processors of the devices and resources described in this document. The process 400 can correspond to a method for surveilling an area that includes one or more properties using a drone 100.

Referring now to process 400, control signals generated at the drone 100 and provided using circuitry positioned in an internal cavity of the drone (410). In some implementations, the control signals are generated at the drone 100 based on communications or commands 370 received by the drone 100. The commands 370 are generated by the monitoring server 360 of system 300. Based on the control signals, the drone 100 operates each fan of a respective fan assembly that is installed in each duct of the multiple ducts that may be included at the drone (420).

The drone 100 generates a first air pressure at a first surface of the drone in response to operating each fan (430). For example, the drone 100 generates air pressure at the top surface 105. In some implementations, the first air pressure is distributed over different portions of the top surface 105 or over an entire surface area of the top surface 105. For example, the first air pressure is distributed over the entire surface area of the top surface 105 based on the top surface being substantially flat. In some implementations, the top surface 105 is completely flat.

The drone 100 generates a second air pressure at a second surface of the drone in response to operating each fan (440). For example, the drone 100 generates air pressure at the bottom surface 107. The second air pressure is higher than the first air pressure based on the first surface being at least substantially flat. In some implementations, the air pressure at the top surface 105 represents an area of low pressure and the air pressure at the bottom surface 107 represents an area of high pressure. The high pressure at the bottom surface 107 maybe substantially higher than the lower pressure at the top surface 105 based on the ducted fans and the uniformly flat surface of top surface 105.

The described techniques include a method of manufacturing a drone, such as drone 100 described above. A housing 102 is provided, where the housing includes a first surface, a second surface, and a sidewall between the first and second surface. The housing can represent a body or frame of the drone. The method includes forming multiple ducts 115 at the housing 102. In some implementations, each duct 115 corresponds to a respective hole that extends from an example first surface 105 to an example second surface 107. The housing or drone has designed structure that facilitates injection molding to improve or ease the manufacturing process. For example, the drone 100 has a shell structure that is user-friendly for implementing injection molding or related manufacturing processes.

A respective fan assembly 110 is installed in each of the ducts 115. The method includes forming an internal cavity at a location intermediate two respective ducts. In some implementations, multiple internal cavities are formed, one for each respective location of the multiple locations. Each of the respective locations is intermediate at least two respective ducts 115. Circuitry positioned in the internal cavity is connected to the fan assembly 110. The circuitry is operable to generate controls signals for operating the fan assembly 110.

The method includes causing the first surface to be substantially flat or completely flat. For example, the housing can be machined or otherwise formed so that the first/top surface 105 is at least substantially flat. The first surface is formed to be substantially flat such that a first, low air pressure is generated at the first surface and a second, high air pressure is generated at the second surface when each respective fan assembly is operated.

Modifications, additions, or omissions may be made to any of the embodiments described herein without departing from the scope of the present disclosure. For example, in some embodiments, the drone of FIG. 1 may include any number of ducts and/or propellers that may not be explicitly illustrated or described. Further, depending on certain implementations, the embodiments described in the present disclosure may not include one or more of the apparatuses, systems, components, etc. that are illustrated and described.

In accordance with common practice, the various features illustrated in the drawings may not be drawn to scale. The illustrations presented in the present disclosure are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," or "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor.

A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A drone comprising:
a housing that includes:
a first continuous surface that i) is substantially flat and ii) extends through a radial center of the housing;
a plurality of ducts that each extend from the first continuous surface to a second surface of the housing, each duct of the plurality of ducts having a respective inlet that includes a rounded edge between an inner wall of the duct and the first continuous surface, each respective inlet of the plurality of ducts forms a merged air inlet that causes a reduction in a static pressure of air at the first continuous surface that flows into the merged air inlet;
an internal cavity at a location intermediate two respective ducts of the plurality of ducts; and
circuitry positioned in the internal cavity, wherein the circuitry is operable to generate control signals;
respective fan assemblies installed in each duct of the plurality of ducts, each respective fan assembly comprising a respective motor that is coupled to receive control signals from circuitry to generate a first air pressure at the first continuous surface and a second air pressure at the second surface when operating the respective fan assemblies, wherein the control signals generated by the circuitry are used to operate the respective fan assemblies,
wherein, when operating the respective fan assemblies, the first continuous surface being substantially flat cooperates with the rounded edge of the respective inlet of each duct of the plurality of ducts causing the first air pressure to be less than the second air pressure; and
a respective stator vane in each of the plurality of ducts, wherein the respective stator vane is secured in a corresponding duct by way of attachment to an inner wall of the corresponding duct.

2. The drone of claim 1, wherein:
the first air pressure is present over an entire surface area of the first continuous surface in correspondence to the first continuous surface being substantially flat.

3. The drone of claim 2, wherein:
operating each respective fan assembly increases the second air pressure at the second surface of the housing which results in a lift for flying the drone; and
the first air pressure at the first continuous surface augments the lift for flying the drone.

4. The drone of claim 1, comprising:
a respective fan for each respective fan assembly;
a plurality of fan blades for each respective fan; and
a gap that represents a distance between a tip of each of the plurality of fan blades and an inner wall of each duct of the plurality of ducts that includes the plurality of fan blades.

5. The drone of claim 4, wherein the distance is not larger than 0.5% of a diameter of each duct of the plurality of ducts that includes the plurality of fan blades.

6. The drone of claim 4, wherein a respective motor disposed in each respective fan assembly is positioned inline with the respective fan of the fan assembly and the plurality of fan blades of the respective fan assembly.

7. The drone of claim 6, wherein one or more of the respective stator vanes are configured to receive electrical connections for routing signals between the circuitry and the respective motor one or more of the fan assemblies.

8. The drone of claim 7, wherein:
the control signals used to operate the respective fan of each respective fan assembly are provided using electrical connections between the circuitry and the respective motor; and
the electrical connections are routed using internal passages in one or more of the stator vanes.

9. The drone of claim 1, comprising a plurality of triangular regions at the first continuous surface of the housing, wherein each triangular region corresponds to a circular dimension of the drone and is defined by a portion of an outer diameter of two respective ducts.

10. The drone of claim 1, wherein the housing comprises a sidewall between the first and second surface and a respective vertical section of each duct of the plurality of ducts is adjacent to and parallel to a corresponding section of the sidewall.

11. The drone of claim 10, comprising an imaging device integrated at the sidewall or the second surface of the housing, wherein the imaging device is used to obtain images of objects external to the drone.

12. The drone of claim 11, wherein the circuitry comprises a processor and a non-transitory machine-readable storage device storing instructions that are executable by the processor to cause performance of operations comprising:
obtaining, using the imaging device, image data associated with the objects;
processing, using the processor, the image data to detect the objects; and
in response to processing the image data, controlling the drone based on the detected objects.

13. A method for monitoring conditions at a property using a drone, the method comprising:
generating control signals using circuitry positioned in an internal cavity of a drone that includes a housing that circumscribes the drone, and a plurality of ducts disposed in the housing, wherein the housing comprises:
the internal cavity positioned at a location intermediate two respective ducts of the plurality of ducts; and
a respective stator vane in each duct of the plurality of ducts, wherein the respective stator vane is secured in a corresponding duct by way of attachment to an inner wall of the corresponding duct;
using the control signals, operating each fan of a respective fan assembly installed in each duct of the plurality of ducts included at the drone, each duct of the plurality of ducts having a respective inlet that includes a rounded edge between an inner wall of the duct and a first continuous surface, each respective inlet of the plurality of ducts forms a merged air inlet that causes a reduction in a static pressure of air at the first continuous surface that flows into the merged air inlet;
generating a first air pressure at the first continuous surface of the drone that extends through a radial center of the housing by operating each fan causing the fans to distribute the first air pressure over an entire surface area of the first continuous surface that is substantially flat; and
generating a second air pressure at a second surface of the drone by operating each fan, wherein the second air pressure is higher than the first air pressure distributed over the first continuous surface that is substantially flat, and, wherein the respective inlet that includes a rounded edge between an inner wall of the respective duct and the first continuous surface.

14. A method of manufacturing a drone comprising:
providing a housing with a first continuous surface, a second surface, and a sidewall between the first continuous surface and the second surface, the first continuous surface extending through a radial center of the housing that circumscribes the drone;
forming a plurality of ducts in the housing, each duct of the plurality of ducts corresponding to a respective hole that extends from the first continuous surface to the second surface, each duct of the plurality of ducts having a respective inlet that includes a rounded edge between an inner wall of the duct and the first continuous surface, each respective inlet of the plurality of ducts forms a merged air inlet that causes a reduction in a static pressure of air at the first continuous surface that flows into the merged air inlet;
installing, in each of the plurality of ducts, a respective fan assembly;
forming an internal cavity at a location intermediate two respective ducts;
forming a respective stator vane in each of the plurality of ducts, wherein the respective stator vane is secured in a corresponding duct by way of attachment to the inner wall of the corresponding duct;
connecting circuitry positioned in the internal cavity to the fan assembly, wherein the circuitry is operable to generate controls signals for operating the fan assembly; and
causing the first continuous surface to be substantially flat such that a first, low air pressure is generated at the first continuous surface and a second, high air pressure is generated at the second surface when each respective fan assembly is operated in correspondence to the first continuous surface being substantially flat and the respective inlet that includes the rounded edge between the inner wall of the respective duct and the first continuous surface.

15. The drone of claim 14, wherein,
when operating the respective fan assemblies: i) the first continuous surface and the merged air inlet generate an area of low air pressure over an entire top surface of the drone; and ii) the area of low air pressure migrates over the entire top surface of the drone to contribute to a hovering efficiency of the drone; and
wherein the first continuous surface is at least a portion of the entire top surface.

\* \* \* \* \*

UNITED STATES PATENT AND TRADEMARK OFFICE
CERTIFICATE OF CORRECTION

PATENT NO. : 11,964,761 B1  
APPLICATION NO. : 16/847581  
DATED : April 23, 2024  
INVENTOR(S) : Olegs Cevacins and Philip Carter It is certified that error appears in the above-identified patent and that said Letters Patent is hereby corrected as shown below:

On the Title Page

Item (72) Inventors:, delete "Jurmaia" and insert --Jurmala--.

In the Claims

In Claim 15, Column 14, Line 14, delete "drone" and insert --method--.

Signed and Sealed this  
Fourth Day of March, 2025

Coke Morgan Stewart  
*Acting Director of the United States Patent and Trademark Office*